Patented Oct. 14, 1941

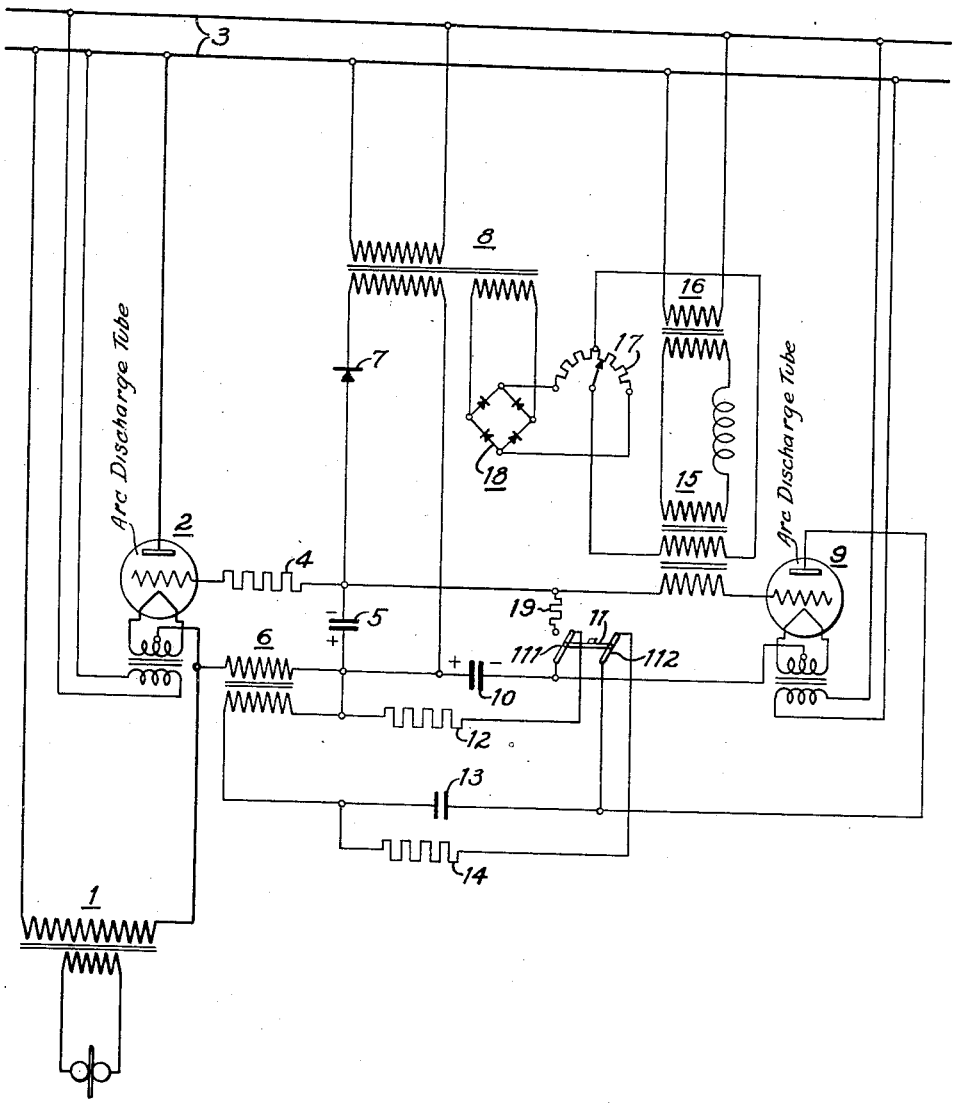

2,259,289

UNITED STATES PATENT OFFICE 2,259,289

HALF-WAVE SPOT WELDING

Wilhelm Blumentritt, Berlin-Haselhorst, Germany, assignor to Westinghouse Electric & Manufacturing Company, East Pittsburgh, Pa., a corporation of Pennsylvania Application May 21, 1938, Serial No. 209,158
In Germany September 9, 1937

5 Claims. (Cl. 250—27)

The main case, an application for spot welders, Serial No. 157,633 filed August 6, 1937, to Richard Schnarz and assigned to the assignee of the parent application, relates to a spot welding device in which the welding circuit is connected to an alternating current potential source through a single anode grid controlled or vapor discharge vessel, and in which, after the closing of an auxiliary switch starting the welding process, the grid potential of the discharge vessel is varied in such manner that, at most, a discharge persisting for a half wave of the feeding alternating current source, is released. The invention of the main application consists in the fact that a resistor is connected in the grid circuit of the discharge vessel in the welding circuit (main discharge vessel) through which a direct current circuit is closed for the purpose of varying the grid potential by the ignition of an auxiliary discharge vessel with gas or vapor filling. Further, it is proposed in the main application, to connect a capacitor in series with the auxiliary discharge vessel which, at the ignition of the auxiliary discharge vessel, is charged through the latter and causes the discharge of the auxiliary discharge vessel to be extinguished.

The object of the present invention is an improvement and a further development of the spot welding device, according to the main application. In accordance with the invention, the anode potential for the D. C. circuit of the discharge vessel is supplied by a capacitor connected in series with the vessel, which is charged before the closing of the auxiliary switch starting the welding process, and when the auxiliary switch is closed, is connected through a resistor to a D. C. source.

The principle of operation of this circuit depends on the following: As anode potential for the auxiliary discharge vessel, a battery or another D. C. source, which supplies a permanently maintained potential, as in the main application, is not used; on the contrary, the anode potential of the auxiliary discharge vessel is supplied by a capacitor which, at first, at the starting of the welding process, is charged, and at that time, the anode potential is built up. The consequence of this is that the auxiliary discharge vessel is not connected in immediately at the closing of the foot switch of the welding machine, but the connecting in takes place after a predetermined time delay. This has the advantage that the metal parts to be welded together are located with certainty in the proper opposite positions, and also are engaged with each other with the required pressure when the welding impulse starts. The time delay, which precedes the starting of the auxiliary discharge vessel, provides, in addition, for the maintenance of the adjusted welding time in the welding device under all circumstances, since the influence of the potential peak width in the grid circuit of the discharge vessel is eliminated by arranging that the closing of the foot switch of the welding machine cannot take place within the time interval of the width of a peak. The starting of the discharge is now only controlled by the maximum of the peak.

In the drawing, an exemplary embodiment of the invention is illustrated. A welding transformer 1 is connected to an A. C. network 3 through a single anode discharge vessel 2 with gas or vapor filling, and arc-like discharge. Between the control grid and the cathode of the discharge vessel 2, the usual grid resistor 4, a capacitor 5 and a transformer 6 are connected. The capacitor 5 is connected to the A. C. source 3 through a dry rectifier 7 and a transformer 8 and supplies the negative potential for the grid of the discharge vessel 2. The transformer 6 produces the ignition potential impulses for the discharge vessel 2. In the sense of the invention of the main application it (the transformer 6) is the resistor through which a D. C. circuit is closed by the ignition of an auxiliary discharge vessel.

To the primary winding of the transformer 6, a grid controlled auxiliary discharge vessel 9, which is filled with gas or vapor and operates with an arc-like discharge just like the main discharge vessel, is connected. The anode potential of the latter auxiliary discharge vessel is supplied by a capacitor 10 which, in the passive condition of the welding device, is short circuited through a contact of the auxiliary switch 11 and a discharge resistor 12. In the anode circuit of the auxiliary discharge vessel, there is, in addition, connected another condenser 13 which also, in the passive condition of the welding device, is short circuited through a contact of the auxiliary switch 11 and a discharge resistor 14.

For ignition of the auxiliary discharge vessel 9, a grid transformer 15, which has two exciting windings, serves. The one winding is connected through a transformer 16 to the A. C. network 3 and is supplied with a triangular wave-form alternating current. The second winding is connected through a regulating resistor 17 to the rectifier 18 which is connected to a secondary winding of the transformer 8. By varying the resistor 17, the time-point at which a potential peak is produced in the secondary winding of the grid transformer 15, may be displaced in phase with reference to the potential of the A. C. network 3. In lieu of the switching parts 15—18, other known devices may be used which produce potential peaks of variable phase position for the grid circuit of the auxiliary discharge vessel 9.

The operation of the welding device is as follows: As long as the auxiliary switch 11 is located in the indicated passive position, the discharge vessels 2 and 9 are blocked. The potential of the condenser 5 supplies the blocking potential for both vessels. The negative charged plate of this condenser is connected to the control grids of the discharge vessels 2 and 9. The positive plate is connected through the transformer 6 with the cathode of discharge vessel 2 and through the resistor 12, as well as a contact of the auxiliary switch 11 with the cathode of the discharge vessel 9.

To start the welding process, the auxiliary switch 11 is closed. In general, the auxiliary switch consists of a relay which is actuated indirectly by the foot switch of the welding machine. The contact 111 of the auxiliary switch joins the condenser 10 with a resistor 19 and connects the condenser 10, in this manner, to the potential of the condenser 5. By the contact 111, the grid of the auxiliary discharge vessel 9 is, in addition, connected through the impulse transformer 15 and the resistor 19 with the cathode of the same discharge vessel. The discharge vessel, however, does not become immediately ignited because the charging current of condenser 10 produces a potential drop in resistor 19 which maintains the discharge vessel blocked. With increasing charge on condenser 10, the blocking potential of resistor 19 decreases until the potential peaks of the grid transformer 15 suffice to ignite the discharge vessel 9. Up to this time-point, the potential of condenser 10 is practically wholly charged to the potential of condenser 5. The condenser 10 now discharges through the ignited discharge vessel 9. Since the primary winding of the transformer 6 is connected in the anode circuit of the auxiliary vessel 9, a potential impulse is produced at this instant in the grid circuit of the main discharge vessel 2 which ignites the main discharge vessel and thereby connects in the welding current.

In the anode circuit of the auxiliary discharge vessel 9, there is, as already mentioned, another condenser 13, the discharge circuit of which is opened at the closing of the auxiliary switch 11 by the contact 112. The condenser 13 is charged by the anode current of the auxiliary discharge vessel 9 and provides that the auxiliary discharge vessel 9 should be blocked after a predetermined time. This time depends on the dimensions of the condenser 13. If the main discharge vessel should, at any time, be connected only once, the condenser 13 must be charged before the positive potential of the main discharge 2 returns after the extinction of the main discharge vessel. If a condenser 13, with large capacity, is selected, the condition may be attained that the main discharge vessel 2 is ignited a plurality of times before the auxiliary discharging vessel 9 is blocked by the condenser 13. Preferably, the condenser 13 is constructed as regulable condenser.

In lieu of the transformer 6, a resistor may also be utilized which is connected in the grid circuit of the main discharge vessel 2. It is only essential that the potential impulse in the grid circuit of the main discharge vessel 2, which is impressed at the ignition of the auxiliary discharge vessel 9, should be so connected that this discharge vessel is ignited.

The circuit shows that no particular D. C. source is necessary for the auxiliary discharge vessel 9, but that its anode potential may be derived from the condenser 10. The charging D. C. potential 5 for this condenser serves in the circuit arrangement at the same time as blocking potentials for both discharge vessels 2 and 9 and indirectly through the discharge of condenser 10 operating as delay member, as anode potential for the auxiliary discharge vessel 9.

It should be further mentioned that the arrangement may be used not only for spot welding but also for other consumers in which the question is to attain potential impulses of exactly adjustable time duration.

I claim as my invention:

1. In combination a main discharge device having a control electrode and a plurality of principal electrodes and a gaseous medium, a source of potential for impressing a potential between said control electrode and one of said principal electrodes to maintain said device non-conductive, an auxiliary discharge device having a plurality of principal electrodes and a gaseous medium, a circuit including the principal electrodes of said auxiliary device for so coupling said auxiliary device between the control electrode and a principal electrode of said main device that when said auxiliary device becomes conductive said main device is rendered conductive, said circuit including a first capacitor and a second capacitor, and means supplied only from said source for charging said first capacitor to impress an energizing potential between the principal electrodes of said auxiliary device, said second capacitor being charged through said auxiliary device from said first capacitor to render said auxiliary device non-conductive after a predetermined time interval.

2. Apparatus according to claim 1 characterized by the fact that the second capacitor is so large compared to the first capacitor that several discharges of the first capacitor are required to charge the second capacitor.

3. Apparatus according to claim 1 characterized by the fact that the second capacitor is so large compared to the first capacitor that several discharges of the first capacitor are required to charge the second capacitor and the first capacitor is maintained continuously charged.

4. In combination a main discharge device having a control electrode and a plurality of principal electrodes, a source of direct current voltage shunted between said control electrode and one said principal electrode, a capacitor, a double-throw switching means which discharges said capacitor in one of its positions and connects said capacitor in series with a resistor across the terminals of said source in its other position, a gaseous discharge tube having a control-electrode and a pair of principal electrodes, means for connecting the control electrode and one principal electrode of said gaseous discharge tube across said resistor when said switching means connects said capacitor in series with said resistor, a second capacitor, means for connecting it in series with the principal electrodes of said gaseous discharge tube and means for causing current-flow through said gaseous discharge tube and said second capacitor to impress a starting-potential on the first-mentioned control electrode.

5. The combination defined in claim 4 with the addition of a source of peaked voltage in series with the control-electrode of said gaseous discharge tube.

W. BLUMENTRITT.